June 12, 1934.  J. M. DANNHEISER  1,962,484
BATTERY CHARGING SYSTEM
Filed Dec. 30, 1929  2 Sheets-Sheet 1

INVENTOR,
JOSEPH M. DANNHEISER.
BY
ATTORNEY

Patented June 12, 1934

1,962,484

UNITED STATES PATENT OFFICE 1,962,484

BATTERY CHARGING SYSTEM

Joseph M. Dannheiser, San Francisco, Calif., assignor to Es-B-Es Co., San Francisco, Calif., a corporation of California Application December 30, 1929, Serial No. 417,459

2 Claims. (Cl. 171—314)

My invention relates to battery charging systems, and particularly to systems in which a storage battery is used for emergency lighting or power service.

An object of my invention is a provide a system which will maintain a storage battery at the best condition for long life and continuous service.

Another object of my invention is to provide a means of maintaining a storage battery, which is subject to an intermittent load, under a constant floating charge; and to automatically increase the charge to full rate when, through use, the battery reaches a predetermined condition of discharge.

Still another object of my invention is to provide a means of limiting the discharge of a battery in such service, in order to prevent destructive discharges, and to maintain the battery in condition to supply minor loads for important services such as fire alarm and the like, even though the charging source may have failed for a relatively long period of time.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings.

My device is applicable to systems comprising a storage battery and a load therefor, and particularly to systems in which the load is applied intermittently and at long intervals, such as an emergency lighting system for hospitals, theatres, and the like.

In general terms my invention comprises means for maintaining a normal constant charge to the battery at a low rate. Means for charging the battery at a high rate is also provided, together with means, responsive to a predetermined condition of battery charge, for transferring the battery from one rate of charge to the other. There is also preferably provided means for limiting the discharge of the battery to the load, so that if service beyond its capacity be required of the battery it will be disconnected from the load before a condition of destructive discharge occurs, and while it still retains sufficient power to actuate a fire alarm system or other similar small power demand whose maintenance is of high importance.

Figure 1:
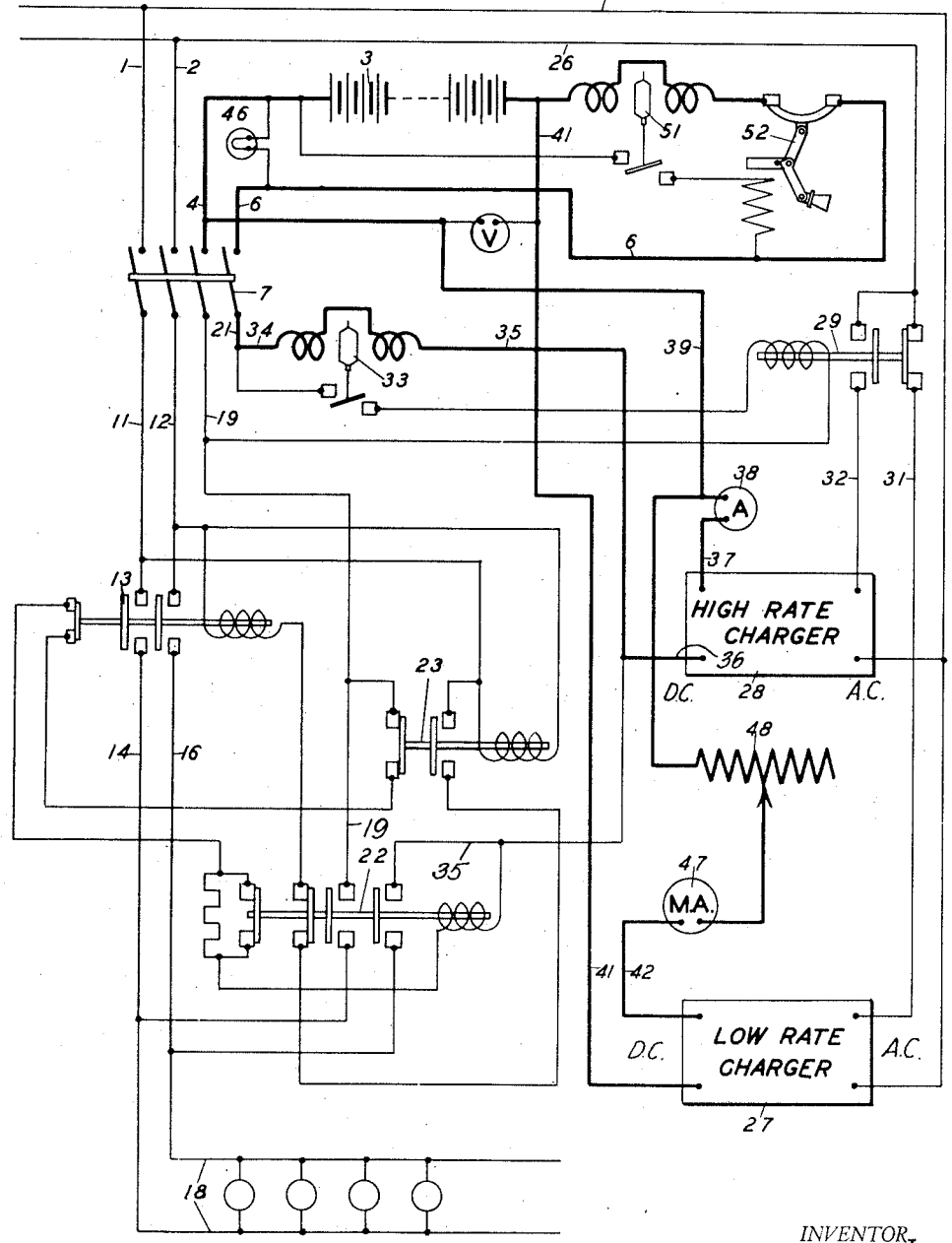
Figure 1 is a diagrammatic representation of an embodiment of my system adapted for use on relatively small loads.

Figure 1 shows the present invention as embodied in an emergency lighting system of the type disclosed in my co-pending application, Serial No. 249,089, filed January 24, 1928. The system is supplied by a regular power source, in this instance the alternating currents supply mains 1 and 2. The battery 3 which comprises the emergency source of power is connected to the emergency supply mains 4 and 6, and both regular and emergency mains are controlled by a disconnecting switch 7.

Beyond the disconnecting switch the A. C. leads 11 and 12 carry the power to the contactor 13, and, when this is closed, through the leads 14 and 16 to the outgoing or load mains 18. The D. C. power from the battery is led through the lines 19 and 21 to the contactor 22, which also connects to the lines 18. The A. C. contactor 13 is voltage actuated through a transfer relay 23, also voltage actuated from the lines 11 and 12. When these lines are excited the latter relay is energized, completing a circuit from line 11 through the second set of contacts of the relay 22 and the coil of the relay 13 back to the line 12. This closes the main contacts of the contactor 13, connecting the power line to the load 18, and opens the auxiliary contacts breaking the circuit actuating the contactor 22 and preventing the operation of the latter.

When the A. C. supply fails the A. C. contacts of transfer relay 23 open and the D. C. contacts close, disconnecting the coil of the contactor 13, thus opening the main contacts and closing the auxiliary contacts thereof, and exciting the actuating coil of contactor 22. This connects the battery 3 to the load and at the same time opens the actuating circuit of contactor 13, prevening its closing until contactor 22 again opens through re-actuation of the transfer relay.

Connected to the regular power source ahead of the switch 7 is a pair of leads 24 and 26; lead 24 is connected directly to one side of a low-rate charger 27 and a high-rate charger 28. Lead 26 connects to a contactor 29 which is of the single pole double throw type in which one pair of contacts closes when the other is open. From the contactor, lead 31 completes the circuit to the charger 27, while lead 32 connects with the high rate charger 28.

If the two chargers are of a type which will operate satisfactorily in parallel, a single pole contactor may be used, the low rate charger being permanently connected across the battery.

The contactor 29 is operated by a relay comprising an ampere-hour-meter movement 33 which is connected through the leads 34 and 35 in series with the line 21, so that it is operated by the discharge of the battery 3 through the load. The output lead 36 of the charger 28 connects with the lead 35. The other output lead 37 from the charger connects through the ammeter 38 with the lead 39 and thence to lead 4 and the battery 3. The ampere-hour-meter relay 33 is provided with relay contacts which are so set that after a predetermined amount of discharge of the battery the contactor 29 will be operated, starting the charger 28. The charger current also passes through the ampere-hour-meter relay, rotating it in the opposite direction, and when the energy withdrawn from the battery has been replaced the contacts of the relay 33 open, operating the relay 29 to disconnect the charger 28 and connecting charger 27.

Charger 27 connects with the battery 3 through leads 41 and 42, which tie in on leads 4 and 6. The charger 27 is thus connected to the battery at all times, whether the switch 7 be open or closed.

It will thus be seen that the battery 3 is at all times receiving a charge at a floating or maintenance rate except when it has been dragged down to such a point as to need a heavy charge, in which case the high rate charger comes into play. This holds true whether the disconnecting switch 7 be open or closed, so that even when the emergency system and the lights that are supplied thereby are disconnected, the battery still receives its floating charge.

By connecting a small permanent load such as the lamp 46 across the battery, chargers of the dry contact and gas discharge type may be made to function practically as constant potential charges. This is done by adjusting the load to such a value that when the battery has received its full charge, the output of the charger is just sufficient to supply it. If the potential of the battery drops, the load taken by the lamp decreases, while that taken by the battery increases, thereby bringing the battery up to full voltage and giving a true floating charge as distinguished from a trickle charge. In this way the battery is at all times maintained in the state of charge which gives the maximum life. In order to assist in regulating the battery for optimum floating charge conditions, a low range ammeter or milliammeter 47 is inserted in the lead 42, together with a variable rheostat 48 for controlling the charger output.

It will of course be understood that since no secondary battery is one hundred per cent efficeint, the charge restored to the battery by the high-rate charger 28 will be less than has been withdrawn by the load. This differential is made up by the continuous floating charge.

Under certain circumstances it is desirable to use the emergency battery as a source of power for fire alarms or similar services which require small power but utmost reliability. In case of a long continued power outage of the regular source, it is possible that the battery may be so depleted as to make such an alarm system inoperative, owing to the fact that even though the contact for connecting the high-rate charger may be closed, the power is not available for re-charging. Furthermore, it is well known that if a battery be completely discharged at any time its life is materially shortened, and a long course of recharging is necessary to bring it back to operative condition. For this reason means are provided to limit the discharge of the battery.

Inserted in the lead 6 is a relay 51 of the ampere-hour-meter type, and this relay is arranged to operate a circuit breaker 52 arranged in series therewith. The relay 51 is arranged to permit the full useful discharge of the battery before the circuit breaker 52 operates, but to operate the breaker just before the final sudden fall in voltage incident to complete discharge occurs. In this manner the useful power delivered by the emergency system will not be materially curtailed, but at the same time, sufficient voltage will be retained in the battery to permit fire alarm operation and to enable it to recuperate upon receiving its normal charge. It will be noted that in the present instance a hand reset is used in connection with the circuit breaker 52 and ampere-hour-meter 51. It is obviously possible to use the same type of connection in this instance to make this breaker self-closing, the connections for accomplishing this being shown in the embodiment of the invention illustrated in the figure next to be described.

Figure 2:
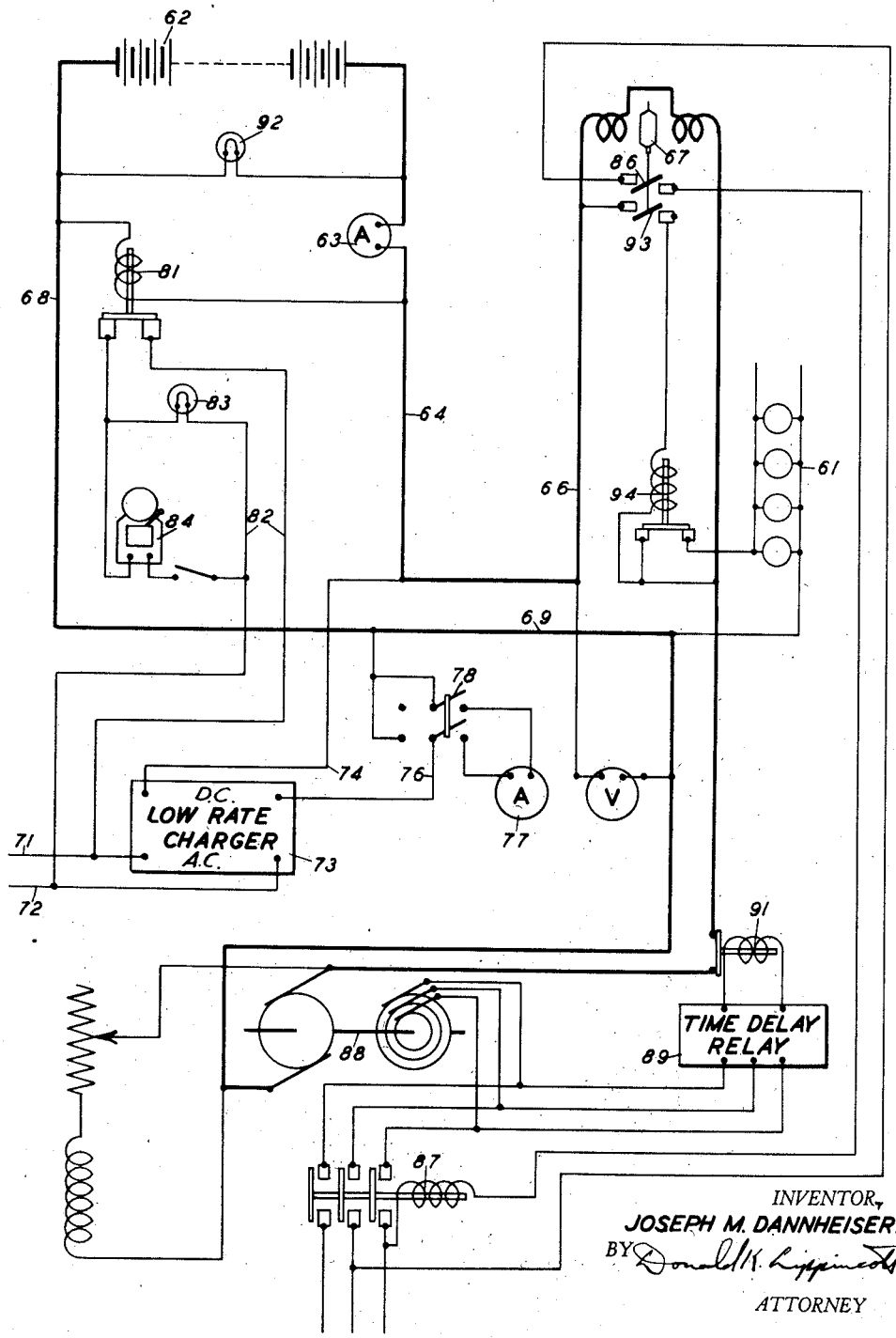
Figure 2 is a similar representation of an embodiment of my device adapted for heavier duty.

The arrangement shown in Figure 2 is used on installations of higher power. In this case only the charger and certain supervisory circuits are shown, the load being indicated merely by the lamps 61 and the contactors for transferring from the main power sourse to the emergency source being omitted, since they are essentially similar to those shown in Figure 1.

The battery 62 which forms the emergency power source is connected through the ammeter 63, leads 64 and 66, the coils of the ampere-hour-meter relay 67, and the contacts of relay 94 to the load. The other side of the battery connects directly to the load through leads 68 and 69. The regular power source is through the lines 71 and 72, connecting to the charger 73, which is arranged constantly to supply the floating rate of charge to the battery through the leads 74 and 76.

An ammeter 77 and ammeter switch 78 are provided for measuring this charge if desired. A supervisory relay 81 is connected across the leads 64 and 68 and is arranged to close a circuit comprising the leads 82 which derives from the supply leads 71 and 72, thus lighting the lamp 83 and ringing the alarm gong 84 in case of failure of the battery 62.

The ampere-hour-meter 67 integrates the discharge from the battery in the same manner as in the preceding case, closing the contact 86 to operate the starting contactor 87 for the motor generator set 88 when the battery has reached a predetermined condition of discharge. A time delay relay 89 of well known type operates the contactor 91 to connect the charging motor-generator to the lines 66 and 69, its current flowing through the ampere-hour-meter relay 67 in a direction reverse to that of the discharge current.

When the charger has reestablished normal battery condition the relay 67 operates to open the contact 86 and disconnect the motor generator set. The small permanent load 92 is connected across the battery in the same manner as in the preceding case, in order that the charge may be at a true floating rate.

In the foregoing description the integrating relays or ampere-hour-meter relays have not been described in detail as they are well known in the art and may be purchased in the open market. It is obvious, moreover, that other criteria of battery charge and discharge may be used than the ampere-hour-meter. If desired the voltage across the battery may be used for this purpose, a voltage operated relay being connected across the storage battery to perform the necessary circuit closures.

In the embodiment of the device shown in Figure 2 the ampere-hour-meter 67 is also used to limit the total discharge of the battery. A second set of contacts 93 actuate the circuit breaker 94 to disconnect the load when the discharge reaches a predetermined limiting value. This arrangement permits the circuit breaker to reclose automatically as soon as sufficient energy has been returned to the battery by the charger 88.

I claim:

1. In a system comprising a battery and an intermittent load therefor, a low-rate charger normally connected to charge said battery, a permanent load floated across said battery and charger, a high-rate charger, switching mechanism for connecting said high-rate charger to charge said battery, and means operative upon a predetermined condition of battery charge for actuating said switching mechanism.

2. In a system comprising a battery and an intermittent load therefor, a low-rate charger normally connected to charge said battery, a permanent load connected across said battery and charger, means for regulating the output of said charger to the maintenance rate of said battery, a high-rate charger, switching mechanism for connecting said high-rate charger to charge said battery, and means operative upon a predetermined condition of battery charge for actuating said switching mechanism.

JOSEPH M. DANNHEISER.